United States Patent [19]

Nakagawa

[11] 4,179,760
[45] Dec. 25, 1979

[54] MARBLE-PATTERNED BATHTUB, BASIN OR SINK

[75] Inventor: Yasuharu Nakagawa, Suita, Japan

[73] Assignee: Topla, Ltd., Osaka, Japan

[21] Appl. No.: 631,076

[22] Filed: Nov. 12, 1975

[30] Foreign Application Priority Data

Jun. 6, 1975 [JP] Japan .................................. 50/68979

[51] Int. Cl.$^2$ .......................... A47K 1/04; E03C 1/18; B32B 27/06; B44F 9/04
[52] U.S. Cl. ..................................... 4/166; 4/173 R; 4/187 R; 428/15; 428/35; 428/203; 428/483
[58] Field of Search ................... 428/35, 15, 215, 204, 428/67, 187, 268, 273, 480, 482, 483, 203, 201; 4/166, 167, 173, 177, 187 R

[56] References Cited

U.S. PATENT DOCUMENTS

| | | | |
|---|---|---|---|
| 3,328,499 | 6/1967 | Barnette | 428/15 |
| 3,341,396 | 9/1967 | Iverson | 428/15 |
| 3,359,574 | 12/1967 | Stoneburner | 4/173 |
| 3,488,246 | 1/1970 | Duggins | 428/15 |
| 3,720,540 | 3/1973 | Wimmer | 428/483 |
| 3,773,886 | 11/1973 | Starr et al. | 428/15 |

*Primary Examiner*—William R. Dixon, Jr.
*Attorney, Agent, or Firm*—Armstrong, Nikaido, Marmelstein & Kubovcik

[57] ABSTRACT

A marble-patterned enclosure such as a bathtub, basin or sink is provided wherein a marble pattern is applied to the back of a transparent acrylic sheet prior to thermoforming. After the acrylic sheet with the marble pattern applied to the back thereof has been thermoformed into the desired configuration a layer of opaque-colored primer, which is a paint consisting essentially of unsaturated polyester and pigment is applied on the pattern printed exterior side of the configuration for the dual purposes of preventing the marble pattern from bleeding, discoloration, etc. and to increase both impact strength and heat resistance of the formed structure. Thereafter on top of the primer, another layer of fiber glass reinforced polyester is applied to provide general reinforcement to the structure. The enclosure of the present invention can easily and inexpensively be fabricated according to this procedure and possesses the appearance of natural marble over the entire outside of the enclosure with superior impact strength and heat resistance.

7 Claims, 3 Drawing Figures

MARBLE-PATTERNED BATHTUB, BASIN OR SINK

The present invention relates to a marble-patterned enclosure such as a bathtub, basin or sink wherein the marble pattern is applied prior to thermoforming in the back side of a transparent acrylic sheet which is then thermoformed into the desired configuration and reinforced with a primer of unsaturated polyester and a layer of glass fiber reinforced polyester applied over the pattern imprinted back of the acrylic sheet and having a color so as to make the marble pattern appear clearly and resemble natural marble.

BACKGROUND OF THE INVENTION

In recent years bathtubs and other enclosures, either made of marble or having the appearance of marble, have become increasingly popular. Because, however, of the high expense of solid marble enclosures and fixtures, it has become the practice to fabricate these enclosures and fixtures from acrylic sheets. Ordinarily, these enclosures and fixtures are made of acrylic sheet produced by the continuous casting method. This procedure has the disadvantage, however, that pigments are frequently unevenly distributed within the sheet and there is the further problem that these acrylic sheets, once they are formed into the fixture, tend to deteriorate or become weakened in localized areas. Also due to the production techniques which are employed in fabricating enclosures and fixtures from these sheets, it is often difficult to repeat or match specific patterns which may be desired, and it is not infrequent that some localized areas do not match in color or in pattern with the result that a part of the sheet is discarded and wasted. Further, the continuous casting method being essentially a mass production system, it is impossible to produce a small batch to suit individual requirements.

In order to overcome the short comings, attempts have been made to apply patterns to acrylic sheets after thermoforming by spraying or applying a printed polyester or polystyrene film to the back of the formed acrylic sheet. Spraying to produce a desired pattern has, however, the disadvantage that it requires a high degree of skill on the part of the individual doing the spraying in order to produce a desired uniform appearance. Further, such spraying techniques cannot be applied to mass producing uniform designs, since the appearance of each article will necessarily vary somewhat. The application of printed polyester or polystyrene films to thermoformed acrylic sheets has the disadvantage that it is quite difficult to apply evenly the film to the intricate corners and undulations in the formed article thus resulting in a product with unsatisfactory appearance particularly at the corners and edges.

Accordingly, it is an object of the present invention to provide an inexpensive marble-patterned enclosure which is light in weight and high in rigidity and which has a marble pattern having an even appearance which can be reproduced exactly in any number of articles.

It is a further object of the present invention to provide a molded marble-patterned enclosure such as a bathtub or basin which can easily and inexpensively be fabricated in order to have the above-noted characteristics.

According to the present invention, an enclosure or fixture such as a bathtub or basin having a marble pattern is fabricated by applying a printed marble pattern to the back side of a generally flat unmolded sheet of acrylic followed by thermoforming the acrylic sheet into the desired configuration. A layer of opaque-colored primer, which comprises an unsaturated polyester containing 0.2 weight percent or more of a white pigment is then applied by spraying or by hand to the back of the acrylic sheet and then a layer of fiber glass reinforced polyester resin containing 20 to 40 weight percent fiber glass is applied to reinforce the structure.

One of the outstanding features of the present invention lies in applying the primer layer (FIG. 3-3) in addition to the FRP reinforcement layer (FIG. 3-4). Without the primer layer, applying FRP layer directly on the marble-patterned side of the sheet is liable to cause bubbles to form between the acrylic sheet and the layer. These bubbles and sometimes stray pieces of glass fiber are visible through the transparent acrylic sheet and render it exceedingly unsightly. Furthermore, the transfer-print ink is affected by the polyester resin of the FRP and the marble pattern frequently becomes deformed by bleeding of the ink or discolored.

Still another advantage of applying the primer layer according to the present invention is that it increases mechanical and physical strength of the enclosure as it brings about a stronger and moe effective contact and adhesion between the sheet, pattern and FRP layer. Impact strength test by the falling ball method proves that impact strength is considerably improved by the present method over those without the primer layer. Also heat resistance test by hot water method, comprising abrupt filling of hot water in the enclosure and maintaining it for a long time, establishes that no peeling off of FRP layer, cracking of the sheet, discoloration or deformation of the marble pattern occurs.

DETAILED DESCRIPTION OF THE DRAWINGS

Figure 1:
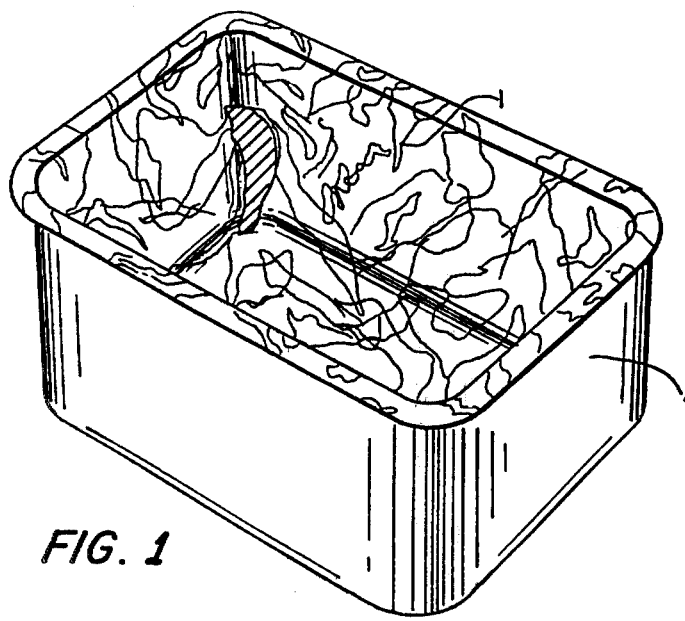
FIGS. 1 and 2 are oblique views of a tub and basin, respectively.
Figure 2:
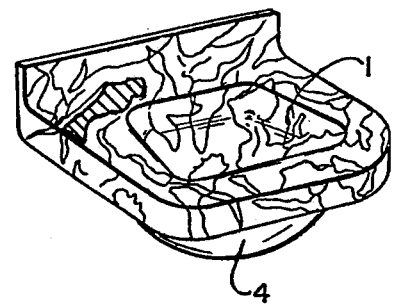

In FIGS. 1 and 2, the interior appearance of the tub and the basin are shown with the marble pattern visible at 1. The exterior fiber glass reinforced polyester layer is shown at 4.

Figure 3:
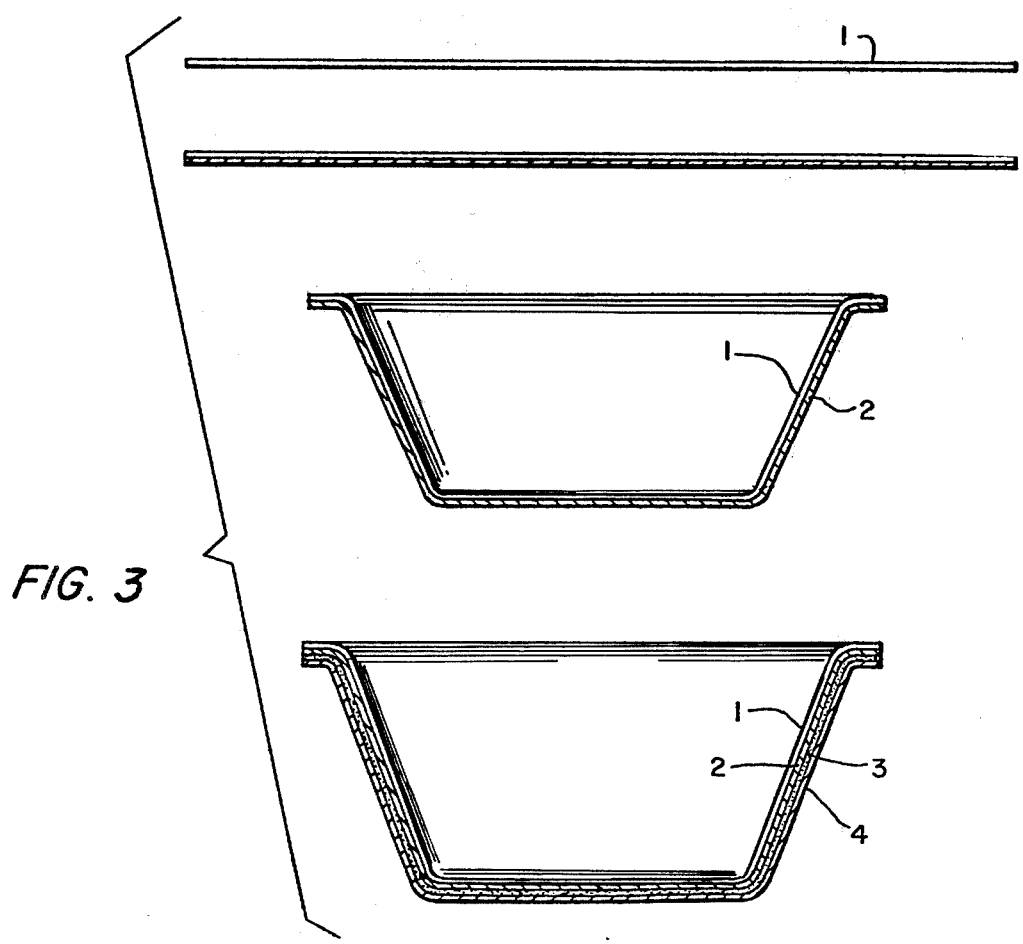
FIG. 3 is a sectional view of an acrylic sheet (1) and marble-pattern printed sheet (2) before thermoforming and also a sectional view after thermoforming showing primer layer (3) and FRP layer (4).

In FIG. 3, the flat acrylic sheet is shown at 1 and the printed pattern, which is applied to the acrylic sheet, is shown at 2. The primer layer and FRP layer are shown at 3 and 4, respectively.

Application of the marble pattern to the back side of the acrylic sheet is accomplished by a simple process of printing or transfer printing of the desired marble pattern according to procedures known in the art. Advantageously, the desired marble pattern is printed on the back side of the acrylic sheet by means of a synthetic resin paint, such as acrylic gravure printing ink.

Once the marble pattern has been applied to one side of the flat acrylic sheet, the sheet is then thermoformed into the desired configuration with the marble patterned side on the outside of the formed configuration by means of known thermoforming techniques such as blow molding, vacuum pressure forming, match mold forming, etc. The actual conditions employed such as temperature pressure and time vary according to the thickness of the acrylic sheet employed and are easily determined by one skilled in the art.

Following molding or forming of the acrylic sheet into the desired shape, a primer layer consisting essentially of unsaturated polyester and a layer of fiber glass reinforced polyester resin are applied by spraying over the printed back side of the acrylic sheet in order to provide reinforcement and sufficient rigidity for the particular acticle being fabricated. Thus, the thickness of the primer layer is approximately 0.3 mm for all enclosures and the fiber glass reinforced polyester layer will normally be between 3–5 mm for bathtubs and 1.5–3 mm for basins.

By carrying out the procedures of the present invention, an acrylic sheet is formed wherein a marble pattern occurs having no significant deterioration in quality due to thermoforming and in which sufficient rigidity can be obtained without requiring the use of thick pieces of acrylic sheet.

Typically, the acrylic sheets employed, according to the present invention, are, for example, polymethacrylate ester sheets such as polymethylmethacrylate sheet, which has excellent transparency. These sheets which are employed according to the present invention will be between 1.5–8 mm thick for bathtubs and 1–5 mm thick for basins or sinks. This range of thickness has been found to provide excellent strength when supported with fiber glass reinforced polyester resin (FRP). It is therefore an advantage of the present invention that it is possible to employ a thinner and lighter acrylic sheet with superior appearance, and with superior performances relative to impact strength and hot water resistance.

EXAMPLE 1

A number of sheets of transfer printing paper were prepared on which the facsimile of marble from a photograph of natural marble was imprinted with acrylic gravure ink. The transfer print of the marble was then transferred onto a transparent polymethylmethacrylate sheet by the heat transfer method at 180° C. A basin was then formed of the marble-patterned methacrylate sheet by vacuum forming at 170° to 180° so that the side having the printed pattern of marble was on the exterior of the basin. By means of a spray gun, a coating consisting essentially of unsaturated polyester was applied as a coating over the printed pattern forming the exterior side of the basin. 1.5% of a white pigment was incorporated into the polyester so that the coating acquired an opaque appearance. The thickness of the coating applied was approximately 0.3 mm. Also by means of a spray gun (or by hand), a coating of 70% polyester resin reinforced by 30% glass fibers was then applied over the pigmented polyester layer to reinforce the structure. The thickness of the reinforced polyester resin layer was about 2.0 mm.

The resulting basin produced according to the method described had a close resemblance to natural marble with the printed facsimile of the marble clearly seen through the transparent acrylic sheet. There were no scars, bubbles or stray pieces of glass fiber present.

In order to test the impact strength of the structure, a steel ball, weighing 198 grams was dropped on the basin from a height of 75 cm. No cracking, peeling or discoloration was however caused.

In order to test the heat resistance of the structure, water heated to 92° C. was poured into the basin and maintained at 82° C.±1° C. for on hour and then drained from the basins. Water at room temperature (i.e., about 15° to 20° C.) was then poured into the basin and maintained for five minutes before being drained. This set of procedures was repeated twenty times with no peeling or deformation being observed between the sheet and the layers and no deformation or discoloration of the marble pattern being noticeable. In another cycle of hot water tests, wherein the basin was filled with water which had been heated to 85° C. and maintained in the basin until the temperature dropped to 60° C., then drained off and replaced by water at room temperature for five minutes with the cycle of procedures being repeated one-hundred times, the same results as previously indicated were obtained.

EXAMPLE 2

The procedures of Example 1 were repeated except that the unsaturated polyester coating was omitted and the fiber glass reinforced polyester resin layer applied directly to the back or exterior of the structure.

The resulting structure was observed to have a number of conspicuous air bubbles and stray pieces of fiber glass present between the methacrylate sheet and the fiber glass reinforced polyester layer. Further, the appearance of the marble pattern was not realistic and suffered by comparison with that found on the structure of the present invention prepared according to Example 1.

When the impact test using a steel ball weighing 198 grams dropped from a height of 75 cm. was repeated, a slight crack was observed at the point of impact with some discoloration due to peeling.

When the hot water resistant tests were repeated as described in Example 1, no peeling deformation or discoloration was observed.

The following Table compares other features of marble-patterned acrylic sheet produced by continuous casting and marble-patterned acrylic sheet prepared according to the method of the present invention:

TABLE

Comparison between Marble-patterned Continuous Casting Acrylic Sheet and Marble-patterned Acrylic Sheet of the present invention.

| | Continuous Cast Marble Pattern Sheet of Prior Art | Marble Patterned Acrylic Sheet of Present Invention |
| --- | --- | --- |
| 1. Marble Pattern | Monotonous and not as realistic as Topla. The pattern is only in 1 casting direction. | Closest possible facsimile of natural marble. |
| 2. Usable space | Pattern being partially too pale or otherwise unfit, the usable space is limited. | Full use is possible. |
| 3. Availability | Being mass-produced, the kinds are limited. One particular kind is not always available in required quantity. | Available in the same way transparent acrylic sheets are available. |
| 4. Quality | Pigment being often unevenly distributed within the sheet, it tends to deteriorate in localized areas. | No problem. |
| 5. Price | Being for a particular use, the demand is limited and therefore more expensive. | Cheaper even adding the cost of transfer printing for a practical number of sheet. |

What is claimed is:

1. A multi-layered article having a thermoformed contoured configuration and the appearance of natural marble which comprises a sheet of molded, transparent acrylic resin having a front side forming the interior surface of the article and a back side with photographic reproduction of marble applied to said back side thereof; a layer comprising an unsaturated polyester resin applied over the exposed side of said photographic reproduction and an outer layer forming an exterior surface of fiber glass reinforced polyester resin applied over said layer of unsaturated polyester resin.

2. The molded article of claim 1 wherein said transparent acrylic resin is methylmethacrylate.

3. The molded article of claim 1 wherein said acrylic resin sheet is about 1 to 8 mm thick and said layer of fiber glass reinforced polyester is about 1 to 5 mm thick.

4. The molded article of claim 1 which is a tub.

5. The molded article of claim 1 which is a basin or sink.

6. The molded article of claim 1 wherein said intermediate layer also contains over 0.2% by weight white pigment.

7. The molded article of claim 1 wherein said glass reinforced polyester resin contains 20 to 40% by weight glass fibers.

* * * * *